Aug. 25, 1925.

C. KNOTT 1,550,703

INTERNAL COMBUSTION ENGINE

Filed Oct. 3, 1921    8 Sheets—Sheet 5

WITNESSES
W. A. Williams
J. P. Schrott

INVENTOR
Charles Knott.
BY
Munn & Co.
ATTORNEYS

Patented Aug. 25, 1925.

1,550,703

UNITED STATES PATENT OFFICE.

CHARLES KNOTT, OF NEW MADRID, MISSOURI.

INTERNAL-COMBUSTION ENGINE.

Application filed October 3, 1921. Serial No. 505,044.

*To all whom it may concern:*

Be it known that I, CHARLES KNOTT, a citizen of the United States, and a resident of New Madrid, in the county of New Madrid and State of Missouri, have invented certain new and useful Improvements in Internal-Combustion Engines, of which the following is a specification.

My invention relates to improvements in internal combustion engines, and it consists in the constructions, combinations and mode of operation herein described and claimed.

An object of the invention is to scavenge the cylinder by the centrifugal motion of a helically injected stream of cool air.

Another object of the invention is to augment the volume of air injected into the combustion chamber.

Another object of the invention is to introduce scavenging air at a pressure higher than under ordinary circumstances but without piercing the gas in a combustion chamber, thereby obtaining a more complete evacuation of the burnt gas.

Another object of the invention is to provide an engine in which the conventional plan of reciprocating a piston inside of a cylinder is rejected, thereby obviating the friction, the necessity of furnishing lubrication according to said plan, and permitting the carrying of much higher minimum temperatures, thereby getting greater expansion of the gas and more power.

A further object of the invention is to take compressed air from a Diesel engine cylinder and re-admit it through a fuel valve to the same cylinder, but at a greater pressure, thus eliminating the customary multi-stage compressor.

A further object of the invention is to introduce into the cylinder of a Diesel engine, fuel and air in oppositely moving helical streams to produce a thorough commingling of the elements of the fuel mixture.

A further object of the invention is to move the fuel spray head into and out of the combustion chamber so as to expose it to the heat only during the period of injection.

A further object is to provide an opening through the center of a centrally located exhaust valve for the purpose of providing an exit for the central core of a body of burnt gas, also utilizing said central opening for the location of a fuel injector valve.

A further object of the invention is to embody the first of the foregoing principles, i. e. that of scavenging the cylinder by the centrifugal motion of a spirally injected stream of cool air, in a Diesel type engine.

Other objects and advantages will appear in the following specification, reference being had to the accompanying drawings, in which:—

Figure 5:
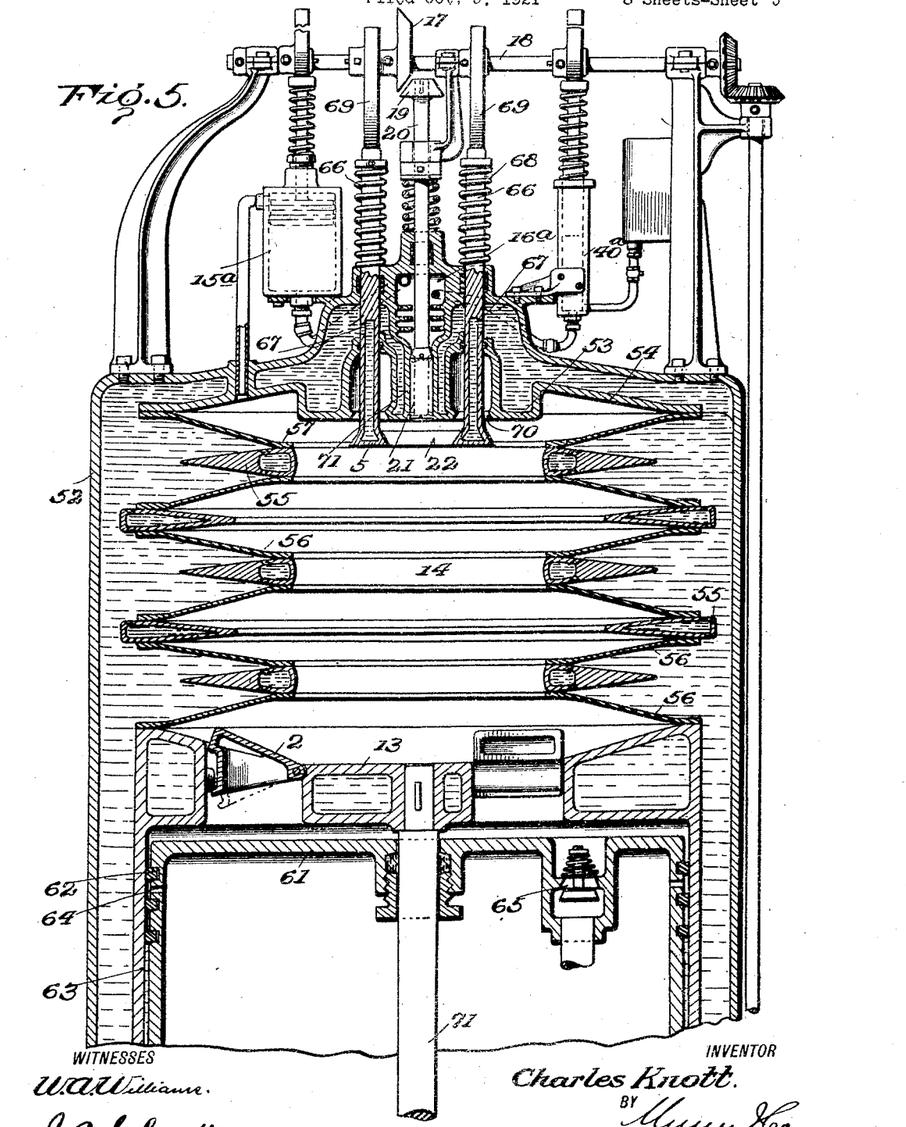
Figure 5 is a vertical section of the upper part of an engine illustrating the first modification which involves all but the second and last objects enumerated above, as is more fully explained below.

Reference is made to my co-pending applications for Letters Patent both for internal combustion engines, and respectively filed August 22, 1921, Serial No. 494,291 and September 17, 1921, Serial No. 501,475, although the inventions involved have nothing in common excepting that they seek to disclose improvements in the Diesel engine. The idea of providing mechanism which enables a cylinder or power unit to produce supercompressed air for its own fuel injection, is a distinct departure from the popular multi-stage compressors which sometimes involve cross-over arrangements between adjacent power units, of which the engines of the applications are examples. The idea of superseding the time-honored arrangement of a working piston reciprocating inside of a fixed cylinder by a reciprocating piston which virtually carries its own cylinder with it, involves another departure from the engines referred to. These and other features of the invention are formally introduced in a brief survey of the invention, which comprises general descriptions that are followed by detail descriptions of the various main forms. The cylinder is thoroughly scavenged by the centrifugal motion of a stream or streams of air which are started in a helical direction by flutes 1 in Figure 1, 1ª in Figure 2, injector flap valves 2 in Figure 5 and tangential nozzles 3 in Figure 9. The injected air takes a helical course (see arrows Figure 2) adjacent to the wall of the cylinder until it approaches the top, then down in a central stream until it reaches the central outlet 4 in Figure 1, and 4ª in Figure 2. In Figure 5 it escapes around the exhaust valve 5 at the top, at the exhaust valve 6 in Figure 11 and at the compound exhaust valve 7 in Figure 13.

Figure 1:
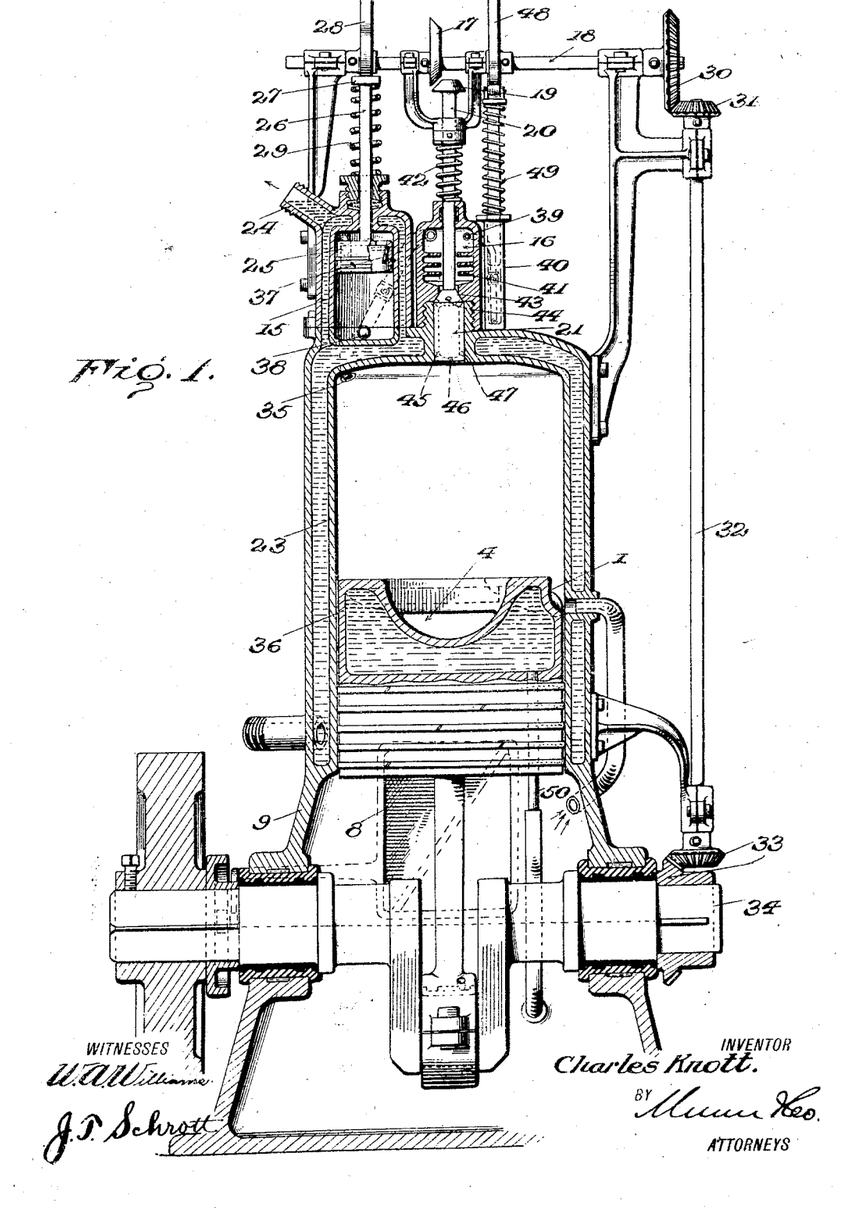
Figure 1 is a vertical longitudinal section of a Diesel type engine, illustrating the application of means for both augmenting the volume of injected air and causing it to assume a centrifugal motion by virtue of being spirally injected.
Figures 2, 3, 4:
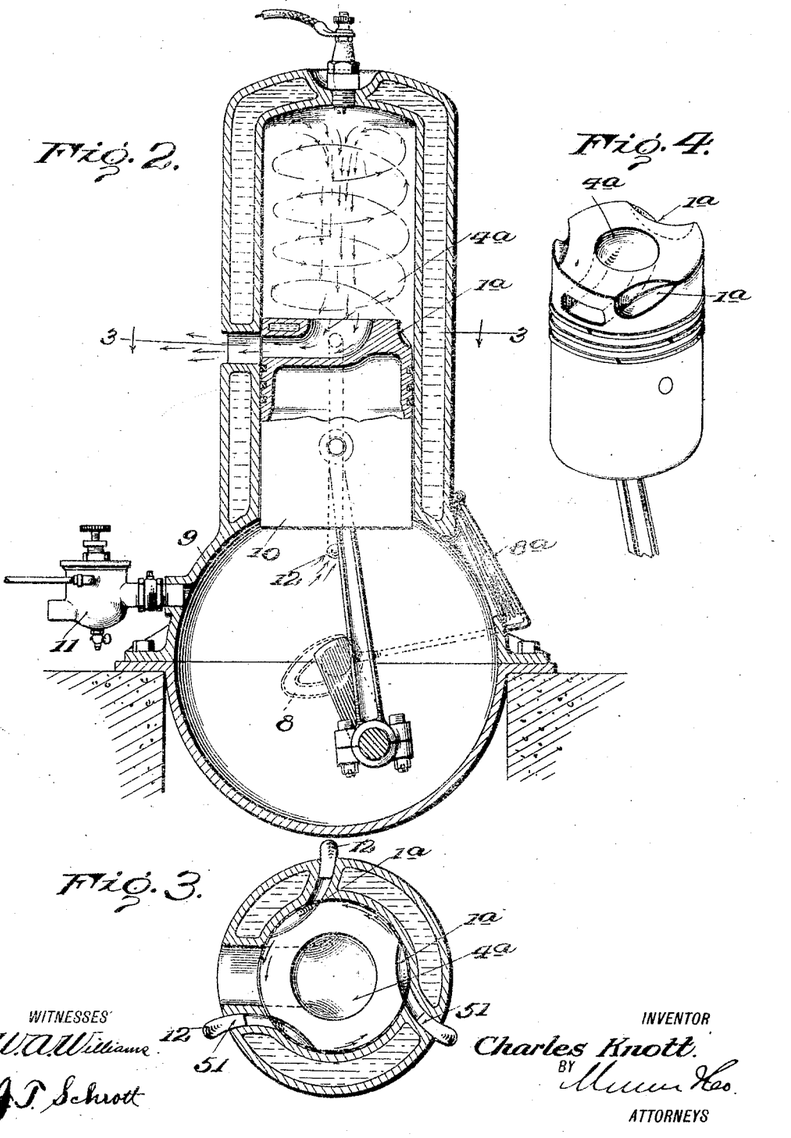
Figure 2 is a vertical cross section of an ordinary two-cycle engine, again illustrating the application of the two foregoing principles.
Figure 3 is a horizontal section on the line 3—3 of Figure 2.
Figure 4 is a detail perspective view of the piston in Figure 2 illustrating the flutes which impart a spiral motion to the injected air.

A bellows 8 in Figure 1 and 8ª in Figure 2, augments the volume of air that is drawn into the crank case and injected into the combustion chamber. In each case the bellows is in direct communication with the crank case 9. It is on the compression stroke of the piston 10 (Figure 2) that air is drawn into the crank case 9 through the carbureter 11. The cam 12 then causes the extension if the bellows 8ª so as to increase the capacity of the crank case. It is by this means that the volume of air which would normally be received by the crank case, is added to.

On the working stroke of the piston 10 crank case compression takes place. Upon uncovering of the transfer ports 12ª by the top of the piston 10, the injection of the augmented volume of air commences, functioning in the manner described above. The upper ends of the transfer ports terminate in nozzles which have individual access to all of the flutes 1 and 1ª. These produce the spiral motion of the air. The principle of operation described in connection with Figure 2 applies to Figure 1.

Were the augmented volume of air discharged directly into the body of burnt gas inside of the cylinder, said body of gas would be pierced. An incomplete scavenging of the cylinder would be the result. By introducing the augmented volume of air in such a manner as to produce a spiral wall of air around the burnt gas, the effect of forcing the burnt gas into a central discharging column, results, so that a far more complete evacuation of the working chamber is obtained.

Figure 9:
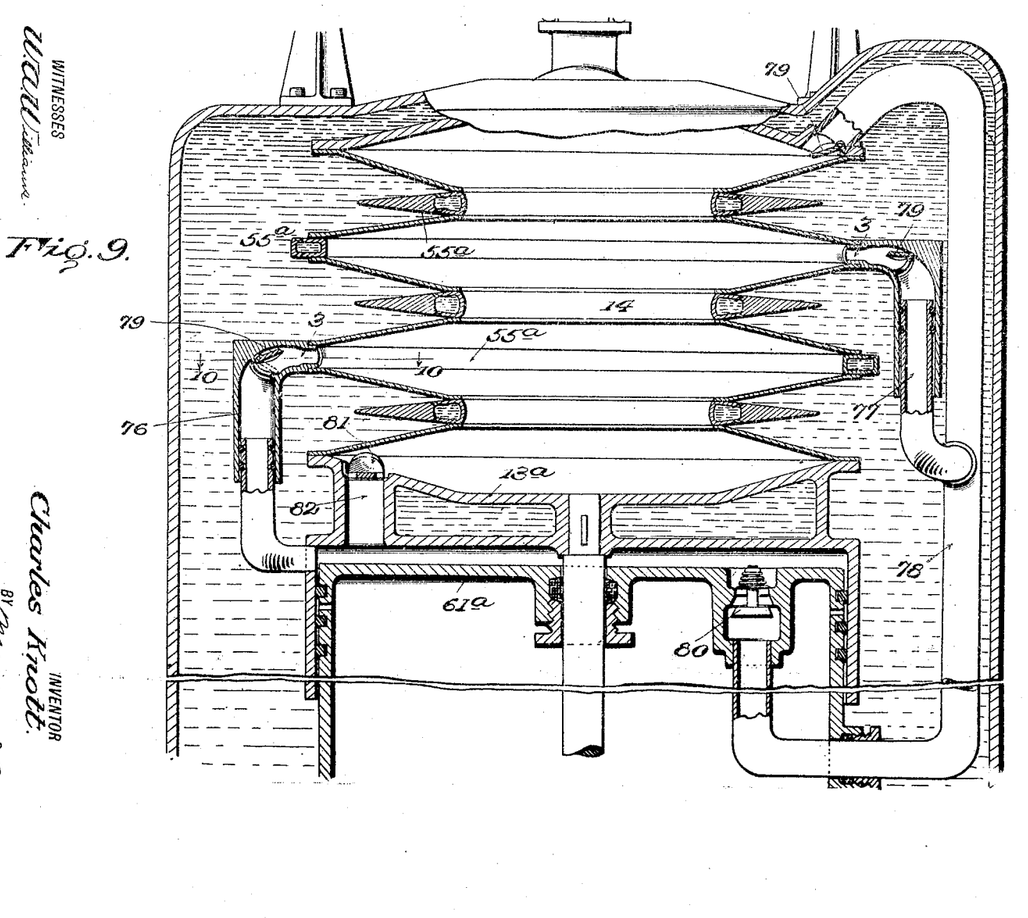
Figure 9 is a section of the upper part of a two-cycle engine illustrating a second modification which is more fully described below.

Instead of reciprocating the piston 13 in Figure 5 and 13ª in Figure 9 inside of a fixed cylinder according to the conventional plan referred to in the fourth object of the invention, the piston is in each case attached to one end of a collapsible and extensible body, constructed and operated somewhat on the order of an accordion or camera bellows, and designated for the want of a better term, the cylinder 14. This so-called cylinder performs all of the functions of the familiar rigid-walled cylinder and has the additional advantages of eliminating friction (since there is no rubbing contact between a piston and cylinder wall), hence eliminating the necessity for lubrication. Since the cylinder contains no lubricant to carbonize at high temperatures, temperatures even higher than those ordinarily encountered, may be produced in this engine.

Figure 11:
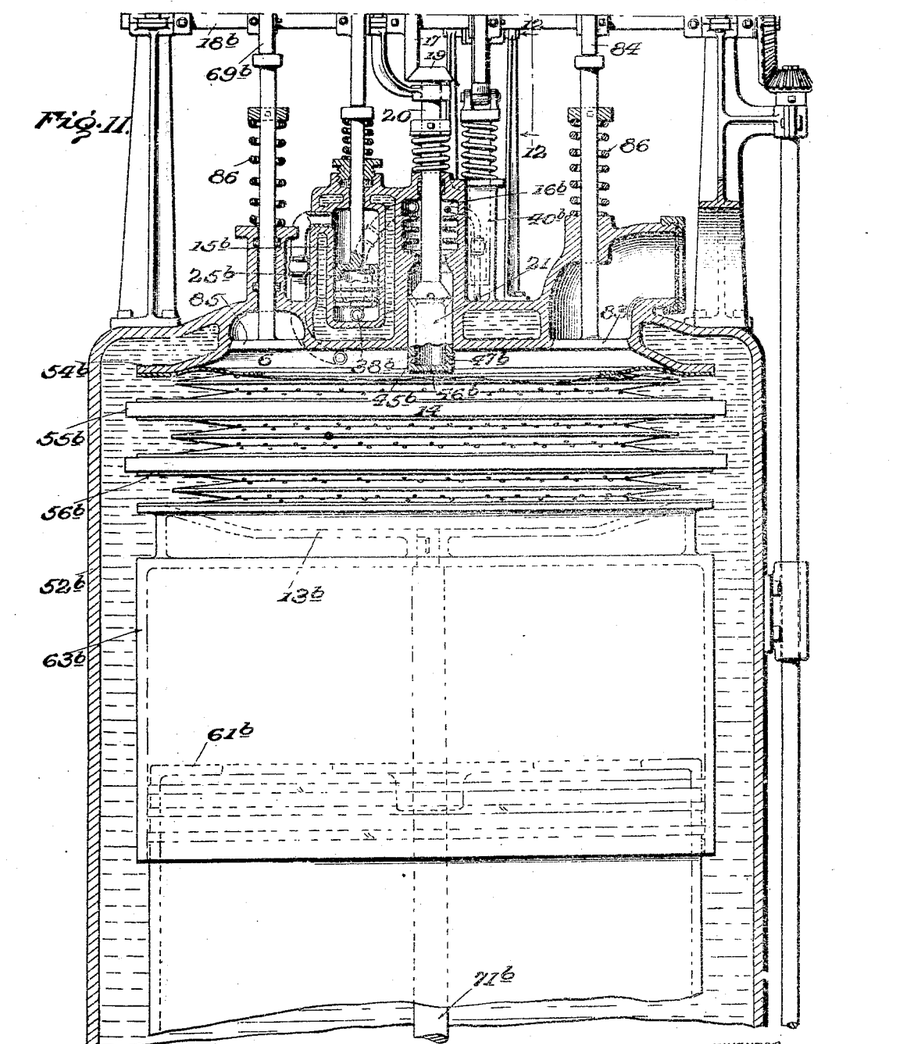
Figure 11 is a section of the upper part of a four-cycle engine, embodying the fuel injector apparatus of Figure 1 and the cylinder construction of Figure 5.
Figure 13:
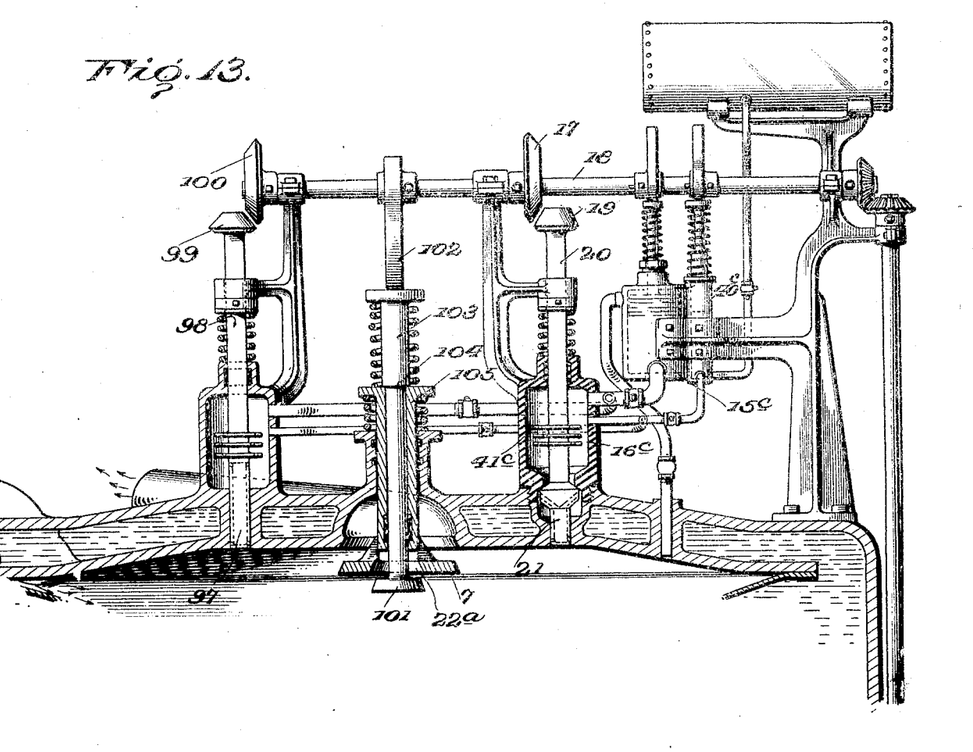
Figure 13 is a section of the upper part of a two-cycle engine, illustrating a third modification which is fully described below.

An air pump 15 in Figure 1, 15ª in Figure 5, 15ᵇ in Figure 11, and 15ᶜ in Figure 13 takes air from its associated power unit, super-compresses it and produces the injection of a combustible charge into the same power unit through a fuel injector valve. The valve is designated 16 in Figure 1, 16ª in Figure 5, 16ᵇ in Figure 11 and 16ᶜ in Figure 13. Each valve includes an injector head. This head is normally out of the working cylinder and thus protected from the heat. Necessarily the injector head is projected into the working chamber when a combustible charge is to be injected, and this is accomplished by a bevel cam 17 (all views referred to) on a shaft 18, which periodically engages a friction wheel 19 and causes the depression of a stem 20 on which the injector head 21 is mounted. In addition to being projected into the working space of the cylinder, the injector head is revolved so as to thoroughly disperse the charge.

According to the sixth object of the invention, streams of scavenging air and fuel are introduced into the cylinder in opposite directions so as to cause the elements to thoroughly commingle and produce a homogeneous fuel mixture. This is a feature of the invention that can readily be ascertained from any of the drawings. In Figure 1 (for example) the flutes 1 (considering them as being arranged like the flutes $1^a$ in Figure 3) will impart a counter-clockwise spiral motion to the incoming air. In order to carry out the object of the invention above named, the injector head 21 must be turned in a clockwise direction so as to oppose the spiral air column and produce the commingling of the elements.

The eighth object of the invention is well illustrated in Figures 5 and 13. Here the burnt gas escapes in the center and at the top of the cylinder. The exhaust valves 5 and 7 are rather large in diameter, and it is anticipated that were the central opening 22 in Figure 5 and $22^a$ in Figure 13 not provided, a dead gas space or pocket would form beneath the exhaust valve and render the evacuation of the cylinder less efficient. By providing the central opening, the core of the column of gas beneath the exhaust valve will find an exit.

In addition to providing the central opening in the exhaust valve for the purpose specified, the fuel spray head also is located in the center of the exhaust valve this, however, being true only of the first modification disclosed in Figure 5, the remaining forms of the invention being intended to show that there is considerable latitude for the choice of locations of the exhaust valve and injector devices.

According to the last object of the invention, certain important elements are embodied in a Diesel type engine as in Figure 1. The contractible cylinder is omitted, but the modified piston, the companion super-compressor and disappearing, whirling injector head and bellows for augmenting the volume of air are all shown to advantage. It is desired to point out at this time that the contractible or diaphragm type of cylinder is not confined in use to Diesel engines as shown in Figures 5, 6, 9, 11 and 13, but it is anticipated that it will prove effective in all types of internal combustion engines, especially for farm tractors and all other places where engines are exposed to dust and impure air. This concludes the description in general of the main features of the invention and commences the detailed descriptions above referred to, beginning with the detailed description of Figure 1. This is intended to represent a two-cycle Diesel engine. The rigid cylinder 23 is water-jacketed, the jacket extending over the super-compressor 15, at the upper extremity of which the water has an outlet 24 for the purpose of leading off the hot water at the highest point and avoiding the forming of a steam pocket. The piston 25 of the super-compressor, is carried by a rod 26. The rod carries a wear plate 27 on top of which the cam 28 bears and beneath which the spring 29 presses.

The cam produces the downward strokes of the piston 25 and the spring the upward strokes. The cam is carried by the shaft 18 (mentioned above) which is driven by gears 30 and 31, the latter on a shaft 32 which in turn is driven at 33 from the engine shaft 34.

Air is conducted by a pipe 35 from the cylinder 23 to the top of the super-compressor 15. The air thus conducted is pure and under compression. Pure, because it is transferred directly from the crank case 9 into which it has been admitted from the atmosphere and had not been passed through a carbureter since this is a Diesel engine. The conduction of air through the pipe 35 occurs during the major part of the inward stroke of the piston 36 and follows the evacuation of the cylinder by the burnt gas. The air under pressure passes through the flap valve 37 to the under side of the piston 25 as the latter assumes approximately the position illustrated.

A downward stroke of the piston 25 super-compresses the air beneath it, causing it to flow through the cross-over 38 into the injector casing 16 where it meets fuel introduced at 39 by the fuel pump 40, is mixed by flowing around the baffles 41 and finally injected into the cylinder 23 through the injector head 21. At this time the piston 36 is approximately at the extremity of its inward stroke. Fuel injection and combustion commences at approximately five degrees before the engine crank reaches the upper dead center and continues through approximately thirty degrees of crank movement past the dead center.

The bevel cam 17 not only extends the injector head 21 into the cylinder 23 at the time of fuel injection, but also (by virtue of its frictional engagement with the disk 19) revolves the head in a clockwise direction so as to thoroughly commingle the combustible charge with the compressed air in the cylinder. The extension or depression of the head 21 occurs against the tension of the spring 42. The injector head 21 is hollow. The upper conical end 43 provides a valve which normally closes the chamber 16 at the bottom. The spring 42 is strong enough to resist the pressure against the upper part of the valve that is exposed to the interior of the chamber. The valve 43 has numerous outlets 44. These are covered when the valve is seated, but communicate with the chamber 16 when the valve is unseated. The head 21 has a number of jets 45, 46 and 47, each bored in a different direction so as to produce a more thorough dispersion of the combustible charge.

A reservoir (Figure 5) furnishes fuel to the pump 40. The plunger of the pump is periodically depressed by a cam 48 on the shaft 18, a spring 49, encircling the plunger, giving it the reverse movement on the return of the cam. It is to be observed that the piston 36 has a water jacketed head. This is in accordance with approved Diesel engine construction. The piston is supplied with water by a telescopic pipe 50.

The construction in Figure 2, requires but little additional description. This is not a Diesel engine as the reader will observe at once, by virtue of the use of the carbureter 11 and spark plug at the top of the cylinder. Attention is directed to Figure 3. The flutes 1ª are constructed on a slight curvature to merge with the nozzles 51 of the air conduits 12ª.

Although these parts are constructed on a curve, they are near enough to tangential positions in respect to the piston to properly initiate the scavenging air on its spiral course around the cylinder. This scavenging air is carburetted (since it passes through the carbureter 11) but the centrifugal motion imparted to it is anticipated to produce so thorough an expulsion of the burnt gas out of the center of the working chamber, that little or none of the air will pass with it.

The first modification in Figure 5, discloses the construction of the contractible or diaphragm cylinder 14. This, and associated parts of the power unit, is encased at 52 to hold cooling water. The head 53 is depressed below the plate 54 which forms the top of the cylinder, and is of such a diameter as to allow free movement of gases in or out of the space next below plate 54 when the so-called cylinder 14 is contracted as in Figure 7. The depression of the head 53 reduces the area of the compression space.

The contraction rings 55 are wedge shaped in cross section but hollow so as to enable the circulation of water for the purpose of cooling the surfaces next to the inside of the cylinder. The rings are arranged in an alternately reverse order, i. e., the fine edges alternately extend toward the outside and toward the inside, this order of arrangement enabling the compacting of the rings when the cylinder 14 in contracted. The rings are joined by flexible contraction plates or rings 56, the edges of which are welded or otherwise suitably secured at 57 to the various contraction rings substantially as shown in Figure 5.

Figures 7, 8, 10, 12:
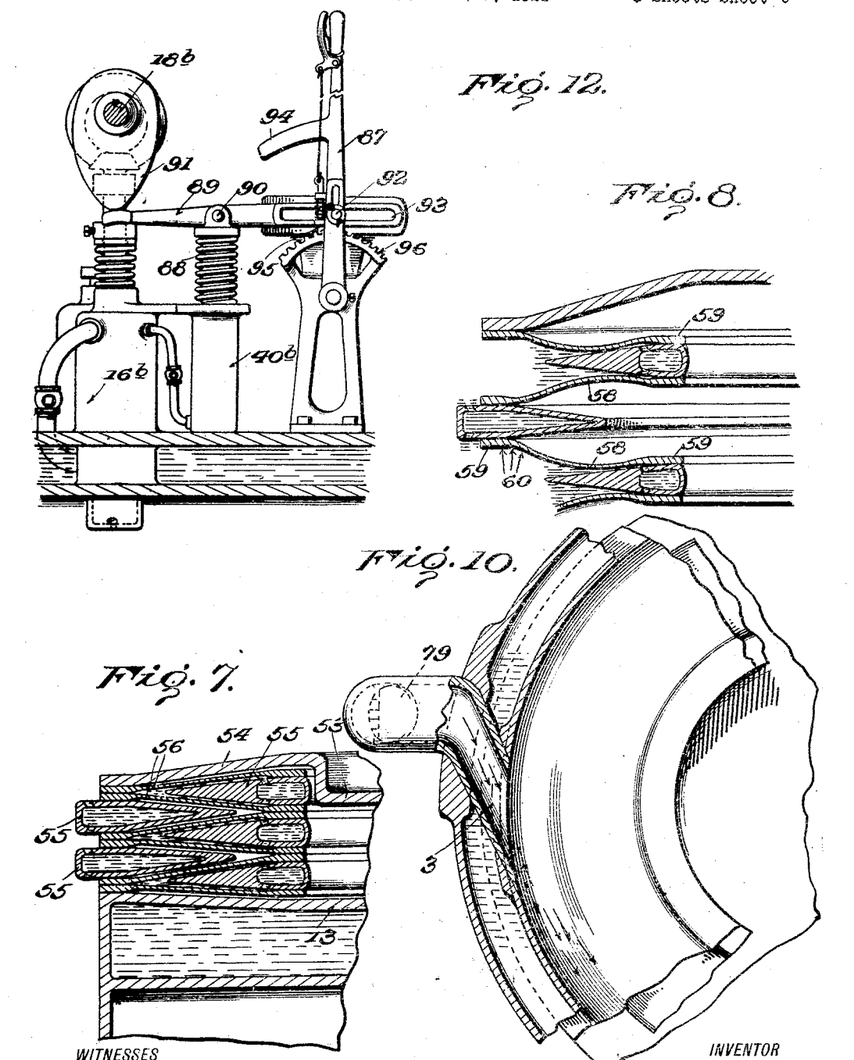
Figure 7 is a detail sectional view illustrating the appearance of a portion of the so-called cylinder, when fully contracted.
Figure 8 is a similar view illustrating the contraction rings in approximately an intermediate position.
Figure 10 is a detail section on the line 10—10 of Figure 9, illustrating one of the tangential nozzles which produce the centrifugal motion referred to in the first object of the invention, by the spiral injection of the air.
Figure 12 is a side elevation of the control for the oil pump in Figure 11, viewed from the position 12—12.

Provision is made for the radial stretching of the plates in the extending and contracting movements of the cylinder 14. These plates are so manufactured as to be under a different tension in the central region than at the edges. This difference in tension is manifested by a decided buckle at 58 when the cylinder assumes a position intermediate of its extremities of movement as illustrated in Figure 8. This buckling of the plates occurs only when the cylinder assumes the position mentioned. The requirement of stretching the plates when the cylinder is in either of its extreme positions, disposes of the buckle 58, and it is thus that a virtual stretching of the plates occurs although an actual elongation of the metal does not take place.

In reference to the modes of fastening the edges of the flexible plates to the various rings, it is proposed in accordance with the modification disclosed in Figure 8 to thicken the edges 59 so as to widen the bending zone 60. In the instance in Figure 5 where the plates are of uniform thickness throughout, the region where the bending occurs is relatively narrow so that the danger of premature crystallization of the metal becomes imminent. But by thickening the edges, as in Figure 8, the place where the metal bends is raised from the surface of the adjacent ring, with the result (as stated) that a bending zone of liberal area is produced, and with it the reduction of the likelihood of the metal breaking prematurely.

Contrary to present constructions, the piston head 13 is attached directly to the so-called cylinder 14, the lowermost flexible plate 56 being welded to the piston, as stated before. The piston reciprocates in respect to the fixed base 61 which constitutes one wall of an air compressor. A number of rings 62 pack the space between the base and the skirt 63 of the piston 13. Since water occupies the space around the side of the base 61 and is likely to work up past the first two rings, a plurality of openings 64 is provided for the purpose of letting such water escape.

A valve 65 admits atmospheric air to the space above the base 61 on the inward stroke of the piston 13. This valve closes on the outward stroke of the piston, and when the pressure beneath the piston (due to the compression of the air) exceeds that of the pressure above, then the injector flap valves 2 open into the full line positions in Figure 5 and cause an injection of the air into the working chamber. In actual practice, these valves are set to inject the streams of air at a tangent to the piston. This initiates the desired spiral motion spoken of before.

The exhaust valve 5 consists of a hollow ring, supported by two stems 66, in turn made hollow up to the lateral inlets 67 which admit water for the cooling of the valve. Springs 68 on the stems tend to normally seat the exhaust valve. Cams 69 on the shaft 18 depress the stems to open the valve. The shaft 18 is driven in the same manner as in Figure 1.

As stated above, the central opening 22 of the exhaust valve provides an egress for the column of exhaust gas which would be pocketed beneath the large valve were the central opening not provided. The exhaust valve seats in the beveled circular opening 70, which when produced, leaves the central core 71 in which the disappearing injector head 21 works. Since the operation of this injector is identical with that of the injector 21 in Figure 1, a repetition of the description and mode of operation may be omitted. The operation and construction of the super-compressor $15^a$ is like that of the super-compressor 15 in Figure 1, this also being true of the fuel pump $40^a$.

Figure 6:
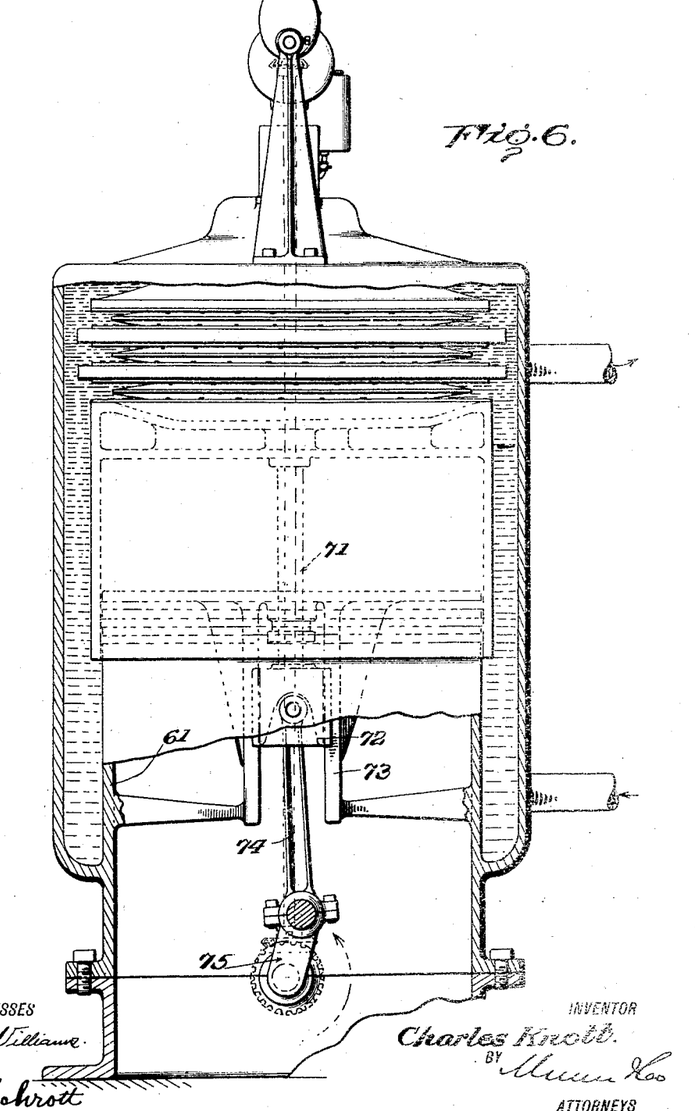
Figure 6 is a cross section of an engine in a plane at right angles to that of Figure 5, the cylinder (so called for the purpose of designation) being shown contracted in side elevation.

The construction in Figure 6, is the same as that in Figure 5, since this is a section of the cylinder in Figure 5 taken in a plane at right angles to that in which the former section is taken. The diaphragm or contractible cylinder 14 is shown compressed or contracted almost to the limit. The rod 71 of the piston 13 carries a crosshead 72 which is actuated on its guides 73 by the connecting rod 74 of the crank 75. The guides are suitably supported inside of the base 61.

The second modification in Figure 9 is similar in its main respects to the arrangement shown in Figure 5, the exception being that the scavenging air injector valves are arranged differently. There is an air conduit on each side. The conduit 76 at the left offers communication between the compressor chamber above the base $61^a$ and the cylinder 14 at the second ring $55^a$ from the bottom. The conduit 77 at the right offers communication between a main 78 and the cylinder 14 at the second ring $55^a$ from the top. Both conduits are telescopic so as to follow the extending and contracting movements of the cylinder wall. The main 78 discharges into the top of the cylinder, all inlets (including the nozzles 3) being valved at 79.

A valve 80 controls the flow of compressed air into the main 78. A valve 81 controls the flow of compressed air through an opening 82 which offers a direct communication between the bottom of the cylinder 14 and the compression space.

Figure 10 illustrates how the nozzles 3 are arranged to inject the air at a tangent. This feature is full discussed above and therefore requires no repetition, it being sufficient to remind the reader that the introduction of the air in a spiral manner causes the complete evacuation of the cylinder by the burnt gas. This function is greatly aided by distributing the injector nozzles along the cylinder 14 as in Figure 9. The arrangement here shown is diagrammatic in so far as the positioning of the nozzles is concerned. In practice, the various nozzles will be placed at suitable locations in the circumference of the cylinder so as to avoid introducing the air at diametrically opposite points only.

The four-cycle engine in Figure 11, embodies most of the elements shown in Figure 5, and wherever like parts are shown, they are designated by similar reference numerals but distinguished by the addition of the exponent "b." Since this is a four-cycle engine, the arrangement of controlling the air and fuel in Figure 5 cannot be followed.

A separate valve 83 controls the influence of fresh air. This valve is operated by a cam 84 on the shaft $18^b$. Similarly, a valve 85 controls the charge of burnt gas, it being operated by a cam $69^b$ on the same shaft. Both valves are normally seated by springs 86.

The operation of the four-cycle engine may be briefly described. Assume the cylinder 14 to be near the limit of contraction on a compression stroke. The piston $25^b$ will be moving down to super-compress a charge of air removed from the combustion chamber. The supercompressed air is forced through the cross-over $38^b$, through the injector casing $16^b$ and finally through the openings $45^b$, $46^b$ and $47^b$ into the chamber, carrying with it the fuel furnished by the pump $40^b$. In Figure 11 the cylinder 14 is past the limit of contraction, and the piston $25^b$ and the valve 21 beginning return strokes.

It is at the end of the first or working stroke of the piston $13^b$ that the exhaust valve 85 is opened. This valve remains opened during the second or exhaust stroke of the piston. At the end of this stroke, the exhaust valve closes and the air inlet valve 83 opens, remaining open during the third or induction stroke of the piston. At the end of this stroke, the air valve closes, the air in the cylinder is compressed until the position in Figure 11 is reached, when the foregoing cycle of operation is repeated.

Figure 12 illustrates an arrangement for controlling the operation of any of the oil pumps, more especially that of the oil pump $40^b$ in Figure 11. It is by means of the lever 87 that the stroke of the plunger 88 can be regulated to pump any desired quantity of oil, or stop the pumping of oil to in turn stop the operation of the engine. The arm 89 is hinged at 90 to a cap on the plunger 88. The left end takes a position beneath the cam 91 on the shaft $18^b$. The lever 87 carries a fulcrum 92 for the arm. The farther the fulcrum 92 is carried to the right of the slot 93 in the arm 89, moving the lever 87 to the right, the longer will the stroke of the plunger 88 be. Consequently, relatively great quantities of oil are pumped into the injector chamber 16ᵇ.

On the other hand, the farther the fulcrum 92 is adjusted toward the left, the shorter will the stroke of the plunger 88 be. When the fulcrum 92 reaches the left extremity, no further rocking motion of the arm 89 can result, this time not by the shortening of the radius of the arm, but by the engagement of a depressor 94 with the arm above the plunger, which depressor holds the plunger down. In this position of the parts the cam 91 cannot engage the arm. The lever 87 is held in its adjusted position by means of a pawl 95 working on the rack 96.

The third modification in Figure 13, is the vehicle for disclosing certain changes in the fuel injector valve and also a change in the arrangement of the exhaust valve. The head 21 at the right is constructed substantially and operates precisely like any injector head in the preceding views of the drawings. But instead of making the baffles 41ᶜ integral with the walls of the injector casing 16ᶜ (see 41 in Figure 1) they are now formed on the stem 20. Their functions are the same, namely, they produce a thorough mixture of super-compressed air furnished by the super-compressor 15ᶜ, with oil furnished by the pump 40ᶜ.

A second type of fuel injector is shown at the left in Figure 13. Here the injector head 97 is of the same diameter as the valve stem. It is moved into the combustion chamber only during the time that the stem 98 is depressed by the engagement of the friction wheel 99 by the cam 100. At such time fuel is injected, the constituents being furnished by the super-compressor 15ᶜ and oil pump 40ᶜ. The type 97 of injector head has the advantage of closing the fuel passage when retracted without requiring a separate valve for that purpose. Both heads are normally retracted from the combustion chamber and thus shielded from the heat.

There is one feature in common between the two types of injectors. Both are unseated by eccentrics which impart a whirling motion thereto due to the nature of the friction disks which engage to produce the unseating. The exhaust valve 7 is a true compound type in that it comprises two valve members 7 and 101 which operate at different times. The cam 102 engages the head of the stem 103, and first causes the unseating of the valve 101 in respect to the valve 7, which, for the purpose of the present illustration, is seated.

Continued movement of the stem 103 conveys the shoulder 104 against the end of the sleeve 105 then causing the unseating of the valve 7. The first movement produces an opening for the core or center of a column of burnt gas beneath the valve 7, and the unseating of the valve produces an exit for the main body of the gas.

In conclusion, it is desired to point out that the walls of the corrugated cylinder 14 may be made of any metal of good tensile strength, probably an alloy of steel. These walls may be made much thinner than cylinder walls are ordinarily made, thereby overcoming one of the serious difficulties of cast iron which is now in general use and which must be of relatively great thickness to give the strength necessary for the high pressures carried and which results in the checking of the interior surface. The difficulties encountered with present constructions practically limits the size of the cylinders.

The arrangement disclosed in this application enables carrying much higher minimum temperatures in the combustion chamber and in the surrounding cooling water than are ordinarily permissible, thereby obtaining greater efficiency in the combustion chamber, requiring the use of less cooling water, and possibly enabling the generation of steam should such be desired. The natural result of carrying higher temperatures in the combustion chamber is to render the burnt gas less dense than the cooler injected fresh air, in turn having the tendency to keep the two separate so that the former will accumulate in the center of the injected air which latter revolves, as fully brought out above.

While the construction and arrangement of the improved internal combustion engine as herein described and claimed, is that of a generally preferred form, obviously further modifications and changes may be made without departing from the spirit of the invention or the scope of the claims.

I claim:—

1. The combination in an internal combustion engine, of means for introducing air to take a circular course in one direction in a cylinder in which it is compressed, means for super-compressing a portion of the air, and means which re-admits said air, conveying a fuel, but causes it to enter in a circular direction opposite to that of the compressed air.

2. The combination of an engine cylinder, means for introducing air at the side of the cylinder, a piston operable in said cylinder having means against which said air is discharged causing it to take a circular course in one direction in said cylinder in which it is subsequently compressed by said piston, means for taking and super-compressing a portion of said air, means to introduce fuel in the path of said super-compressed air, and means operated to re-admit said fuel-laden air into the cylinder but cause it to enter in a circular direction opposite to that of the original air.

3. The combination of an engine cylinder, means to inject air at the side of the cylinder, a piston operable in said cylinder having a flute against which said air is injected and by which it is caused to take a circular course in one direction in said cylinder in which it is subsequently compressed by the piston, means for super-compressing a portion of the air, means for introducing fuel to be taken up by said super-compressed air, and a revoluble injector head adapted to re-admit the fuel-laden air into the cylinder said head having orifices so arranged as to cause said fuel-laden air to enter in a circular direction opposite to that of the original air.

4. The combination of an engine cylinder, a crank case upon which it is mounted, a piston operable in the cylinder and being adapted to compress air in the crank case, means to conduct compressed air from the crank case into the cylinder at one side, means on the piston including suitably formed flutes adapted to cause said air to take a circular course in one direction in the cylinder in which it is subsequently again compressed by the piston, means for taking and super-compressing a portion of said air, means to discharge fuel so as to be taken up by said super-compressed air, and means for admitting said fuel-laden air in substantially the central top of the cylinder said means including an injector head having orifices so arranged as to cause said fuel laden air to enter in a circular direction opposite to that of the compressed air.

5. In an internal combustion engine having a working chamber, means for introducing into the working chamber a spray of air revolving in one direction, a normally closed fuel injector, and means for both moving the injector to an open position and turning it to introduce a spray of fuel revolving in the opposite direction.

6. In an internal combustion engine having a working chamber, means for introducing into the working chamber a spray of air revolving in one direction, means to supply fuel under compression, an injector at which the fuel is introduced into the chamber to meet the air, and means for simultaneously opening the injector and turning it to discharge a spray of fuel revolving in a direction opposite to that of the air.

7. In an internal combustion engine having a working chamber, means for introducing into the working chamber a spray of air revolving in one direction, means for delivering fuel under compression, a valve casing into which the fuel is delivered, an injector controlling the discharge of fuel into the working chamber said injector including a stem, means on the stem to seat the injector, and combined depressing and turning means for simultaneously opening the injector and turning it against the influence of said seating means to deliver a spray of oil into the working chamber revolving in a direction opposite to that of the air.

8. In an internal combustion engine including a working chamber, means for introducing into the working chamber a spray of air revolving in one direction, means to deliver fuel under pressure, a valve casing into which the fuel is delivered, an injector seated in an outlet of the valve casing to control the passage of fuel, a stem carrying the injector passing through the casing, means including a spring acting on the stem to seat the injector, a beveled friction disk carried by the stem, an operating shaft, and a beveled friction cam carried by the shaft to engage the disk and simultaneously depress and revolve the injector to deliver fuel in a direction of revolution opposite to that of the air.

9. In an internal combustion engine having a working chamber, a piston having means against which air is discharged causing it to move spirally in one direction in said chamber in which it is subsequently compressed, an air compressor receiving some of the air and having a piston to super-compress the air, means including a pump for delivering fuel, a casing in which the fuel and super-compressed air mingle, an injector controlling the deliver of fuel and super-compressed air to the working chamber, a revolving shaft, means on the shaft for periodically operating the super-compressor piston and fuel pump respectively, and means also on the shaft for simultaneously opening and turning the injector to admit a spray revolving in a direction opposite to that of the air in the working chamber.

CHARLES KNOTT.